United States Patent
Zhu

(10) Patent No.: US 11,700,578 B2
(45) Date of Patent: Jul. 11, 2023

(54) DOWNLINK CONTROL SIGNALING DETECTION METHOD AND APPARATUS, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/076,153

(22) Filed: Oct. 21, 2020

(65) Prior Publication Data
US 2021/0037471 A1    Feb. 4, 2021

Related U.S. Application Data

(63) Continuation of application No. PCT/CN2018/090511, filed on Jun. 8, 2018.

(51) Int. Cl.
*H04W 52/02* (2009.01)

(52) U.S. Cl.
CPC .................. *H04W 52/0229* (2013.01)

(58) Field of Classification Search
CPC ......... H04W 52/0229; H04W 52/0216; H04W 76/28; H04W 52/0225; Y02D 30/70; H04L 1/0023
See application file for complete search history.

(56) References Cited

U.S. PATENT DOCUMENTS

| 8,532,015 B2 | 9/2013 | Che et al. |
| 2011/0267957 A1 | 11/2011 | Du et al. |
| 2018/0007734 A1* | 1/2018 | Kela .................. H04W 52/0216 |

FOREIGN PATENT DOCUMENTS

| CN | 101754273 A | 6/2010 |
| CN | 102036346 A | 4/2011 |
| CN | 102420786 A | 4/2012 |
| CN | 102612849 A | 7/2012 |
| CN | 102170624 B | 7/2014 |
| CN | 107396452 A | 11/2017 |
| CN | 107820721 A | 3/2018 |
| EP | 2 386 182 B1 | 12/2014 |
| WO | WO 2017217397 A1 | 12/2017 |

OTHER PUBLICATIONS

International Search Report in International Application No. PCT/CN2018/090511, dated Feb. 20, 2019.
First Office Action of Chinese Application No. 201880000799.0, dated Aug. 4, 2020.
Examination Report of Indian Application No. 202147000611, dated Jan. 4, 2022.

(Continued)

*Primary Examiner* — Marcos L Torres
(74) *Attorney, Agent, or Firm* — Finnegan, Henderson, Farabow, Garrett & Dunner, L.L.P.

(57) ABSTRACT

A method for downlink control signaling detection, applied to a terminal, includes: receiving awakening control signaling sent by a base station, the awakening control signaling including indication information for the terminal to perform control signaling detection; and performing the control signaling detection according to the awakening control signaling.

8 Claims, 17 Drawing Sheets

(56) References Cited

OTHER PUBLICATIONS

Extended European Search Report in European application No. 18921879.5, dated Jan. 31, 2022.
Written Opinion of the International Search Authority in the International Application No. PCT/CN2018/090511, dated Feb. 20, 2019.
Qualcomm Incorporated: "Efficient monitoring of DL control channels", 3GPP TSG RAN WG1 Meeting #90, R1-1712806, Prague, Czechia, Aug. 21-25, 2017, 11 pages.
Huawei, Hisilicon: "Considerations on 'wake-up signal' for eFeMTC", 3GPP TSG RAN WG1 Meeting #88bis, R1-1704282, Spokane, USA, Apr. 3-7, 2017, 4 pages.
CATT: "Motivation of UE Wakeup Mechanism in NR" 3GPP TSG RAN Meeting #75, RP-170410, Dubrovnik, Croatia, Mar. 6-9, 2017, 8 pages.
Xia, Yingying, "Research on Handover Mechanism With High Reliability Under High-Mobility Scenario", Database of Chinese Excellent Master's Dissertations, dated Apr. 2013.
3GPP TSG RAN Working Group 1 (Layer 1); List of WG1 Temporary Documents, Nov. 11, 2012, 221 pages.
3GPP TSG RAN WG1_RL1, "TDoc_List_Meeting_RAN1#73", Jun. 5, 2017, 234 pages.
Notification to Grant Patent Right for Invention of Chinese Application No. 201880000799.0, dated Mar. 2, 2022.

\* cited by examiner

| ID 1 | ID 2 | ...... | ID N |

FIG. 6

DOWNLINK CONTROL SIGNALING DETECTION METHOD AND APPARATUS, AND STORAGE MEDIUM

CROSS-REFERENCE TO RELATED APPLICATIONS

This application is a continuation application of International Application No. PCT/CN2018/090511, filed on Jun. 8, 2018, the entire contents of which are incorporated herein by reference.

TECHNICAL FIELD

The present disclosure relates to the technical field of communication, and more particularly, to a downlink control signaling detection method and apparatus, and a storage medium.

BACKGROUND

In Long Term Evolution (LTE), a terminal realizes uplink and downlink transmission based on scheduling of a base station. The base station sends uplink or downlink scheduling signaling to indicate the terminal to receive or send data in the form of notification on a corresponding resource position.

In general, the standby capability of a terminal is an important influential factor on terminal performance. The overhead spent on control signaling detection of the terminal is an important influential factor of terminal power consumption. When the terminal has no data for interaction, the base station will send no control signaling to the terminal. Correspondingly, the terminal may not detect control signaling when performing control signaling detection.

SUMMARY

According to a first aspect of the present disclosure, a method for downlink control signaling detection is provided. The method is applied to a terminal and includes: receiving awakening control signaling sent by a base station, the awakening control signaling including indication information for the terminal to perform control signaling detection for downlink control signaling; and performing the control signaling detection according to the awakening control signaling.

According to a second aspect of the present disclosure, a method for downlink control signaling detection is provided. The method is applied to a base station and includes: determining whether a preset awakening time is reached, wherein the preset awakening time is a time for awakening a terminal to perform control signaling detection for downlink control signaling; and sending awakening control signaling to the terminal when the awakening time is reached, wherein the awakening control signaling includes indication information for the terminal to perform the control signaling detection.

According to a third aspect of the present disclosure, a terminal is provided. The terminal includes: a processor; and a memory configured to store instructions executable by the processor. The processor is configured to: receive awakening control signaling sent by a base station, wherein the awakening control signaling includes indication information for the terminal to perform control signaling detection for downlink control signaling; and perform the control signaling detection according to the awakening control signaling.

According to a fourth aspect of the present disclosure, a non-transitory computer-readable storage medium is provided. The storage medium has stored therein instructions that, when executed by a processor of a terminal, cause the terminal to perform the method according to the first aspect.

According to a fifth aspect of the present disclosure, a base station is provided. The base station includes: a processor; and a memory configured to store instructions executable by the processor. The processor is configured to: determine whether a preset awakening time is reached, wherein the preset awakening time is a time for awakening a terminal to perform control signaling detection for downlink control signaling; and send awakening control signaling to the terminal when the awakening time is reached, wherein the awakening control signaling includes indication information for the terminal to perform the control signaling detection.

According to a sixth aspect of the present disclosure, a non-transitory computer-readable storage medium is provided. The storage medium has stored therein instructions that, when executed by a processor of a base station, cause the base station to perform the method according to the second aspect.

Technical schemes provided by the embodiments of the present disclosure may include the following beneficial effects. When the terminal is in a connected state, the control signaling detection for the downlink control signaling is stopped. The control signaling detection for the downlink control signaling is performed according to the received awakening control signaling which is sent by the base station. Therefore, the terminal can detect the control signaling according to the instructions of the base station, so that the overhead for terminal detection is reduced.

It should be understood that the above general description and the following detailed description are exemplary and explanatory only, and are not intended to limit the disclosure.

BRIEF DESCRIPTION OF THE DRAWINGS

The accompanying drawings are incorporated in and constitute a part of the specification, illustrate embodiments consistent with the disclosure, and explain the principles of the disclosure together with the specification.

FIG. 6 is a schematic diagram of indication information in awakening control signaling, according to an exemplary embodiment.

DETAILED DESCRIPTION

Exemplary embodiments will be described in detail below, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of apparatuses and methods consistent with some aspects of the disclosure as detailed in the appended claims.

In an LTE system, a dormant state of a terminal is defined to reduce the overhead on terminal detection. Therefore, the terminal can start a dormant state without existence of data interaction so as to avoid performing detection of control signaling. When the terminal is dormant, a PDCCH (Physical Downlink Control Channel) may be monitored periodically based on base station configurations, so that whether it is necessary to start an activated state can be determined. However, due to periodical monitoring of the PDCCH, the overhead for control signaling detection by the terminal may be high. Embodiments of the present disclosure provide methods and apparatuses for downlink control signaling detection to reduce overhead for control signaling detection.

Figure 1:
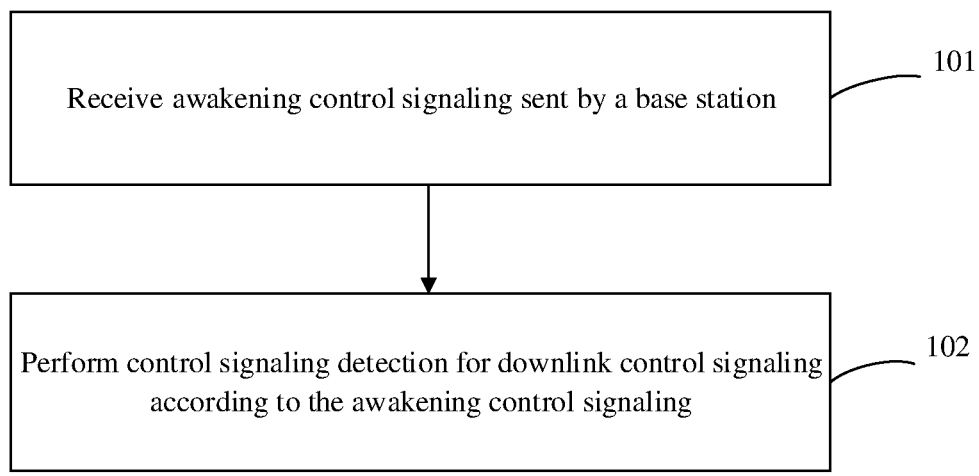
FIG. 1 is a flow chart of a method for downlink control signaling detection, according to an exemplary embodiment.

FIG. 1 is a flow chart of a method for downlink control signaling detection, according to an exemplary embodiment. The method may be applied to a terminal. As shown in FIG. 1, the method includes the following steps.

In step 101, awakening control signaling sent by a base station is received. For example, the awakening control signaling is downlink control signaling. The signaling may include indication information for the terminal to perform control signaling detection for downlink control signaling.

For example, one time or a group of times for the terminal to perform control signaling detection, also referring to as downlink control signaling detection, may be pre-configured by the base station, and awakening control signaling is sent to the terminal during a period before arrival of each detection time.

In step 102, control signaling detection for downlink control signaling is performed according to the awakening control signaling.

In one implementation, the method for downlink control signaling detection may also include: before receiving the awakening control signaling sent by the base station, stopping the control signaling detection for the downlink control signaling when the terminal is in a connected state. Based on this, the overhead for downlink control signaling detection by the terminal may be further reduced.

In the embodiment, when the terminal is in a connected state, the control signaling detection for the downlink control signaling is stopped. The control signaling detection for the downlink control signaling is performed according to the received awakening control signaling which is sent by the base station. Therefore, the terminal can detect the control signaling according to instructions of the base station, so that the overhead for terminal detection may be reduced.

In one implantation, stopping the control signaling detection for the downlink control signaling when the terminal is in a connected state may include: the control signaling detection for the downlink control signaling is stopped after the terminal enters a connected state or after the terminal enters a connected state and completes one or more data interactions, and till the awakening control signaling sent by the base station is received, the control signaling detection for the downlink control signaling can be performed according to the awakening control signaling. When the terminal completes a Radio Resource Control (RRC) connection establishment, the terminal turns from an idle mode to a connected mode. The terminal is deemed to be in a connected state when it is running under the connected mode. Data interactions completed by the terminal may be that the terminal receives a data packet sent by the base station or sends a data packet to the base station.

In one implementation, the downlink control signaling detection by the terminal may be stopped when it is found that data packet transmission is finished; or the base station may send the downlink control signaling to the terminal to inform it of stopping the downlink control signaling detection.

In one implementation, a detection behavior of the terminal can be determined based on an indication, also referred to as indication information, carried by the awakening control signaling. The detection behavior of the terminal may include: whether the terminal performs the control signaling detection for the downlink control signaling in a preset time window; whether the terminal performs the control signaling detection for the downlink control signaling on a designated number of transmission units; an aggregation degree level of the downlink control signaling needed to be detected by the terminal; a length of the downlink control signaling needed to be detected by the terminal; a position of the downlink control signaling needed to be detected by the terminal, etc.

Figure 2:
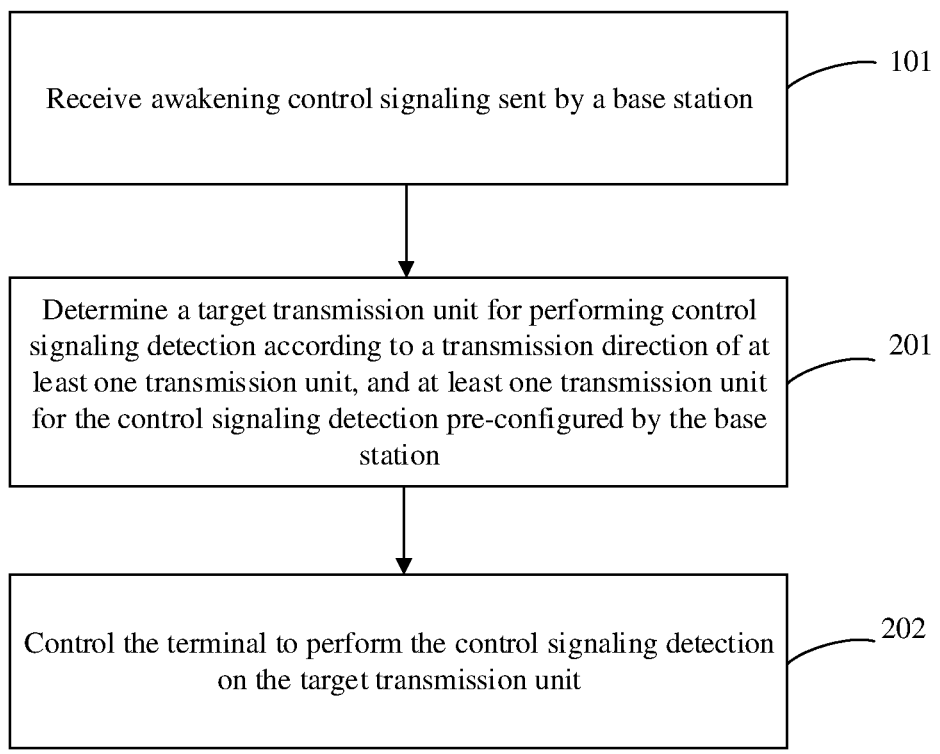
FIG. 2 is a flow chart of a method for downlink control signaling detection, according to an exemplary embodiment.

FIG. 2 is a flow chart of a method for downlink control signaling detection, according to an exemplary embodiment. In the embodiment, the awakening control signaling may indicate a transmission direction of at least one transmission unit for the terminal. For example, the awakening control signaling includes direction indication information with which the transmission direction of the transmission unit can be indicated. The transmission unit for the terminal may be a transmission unit to be sent or received by the terminal. The transmission direction of the transmission unit may include an uplink state, a downlink state or other defined states. The uplink transmission direction of the transmission unit indicates that the transmission unit is configured for uplink transmission, namely transmission is conducted from the terminal to the base station. The downlink transmission direction of the transmission unit indicates that the transmission unit is configured for downlink transmission, namely transmission is conducted from the base station to the terminal. The transmission unit may include a slot, symbol, sub-frame or wireless frame, etc.

As shown in FIG. 2, step 102 of FIG. 1, i.e., performing control signaling detection according to the awakening control signaling, may further include step 201 and step 202. In step 201, a target transmission unit for performing the control signaling detection is determined according to a transmission direction of at least one transmission unit, and at least one transmission unit for the control signaling detection pre-configured by the base station; and in step 202, the terminal is controlled to perform the control signaling detection on the target transmission unit. The base station can inform the terminal of the transmission units configured for control signaling detection in advance through RRC signaling, Medium Access Control (MAC), Control Elements (CEs) or physical layer signaling.

Figure 3A:
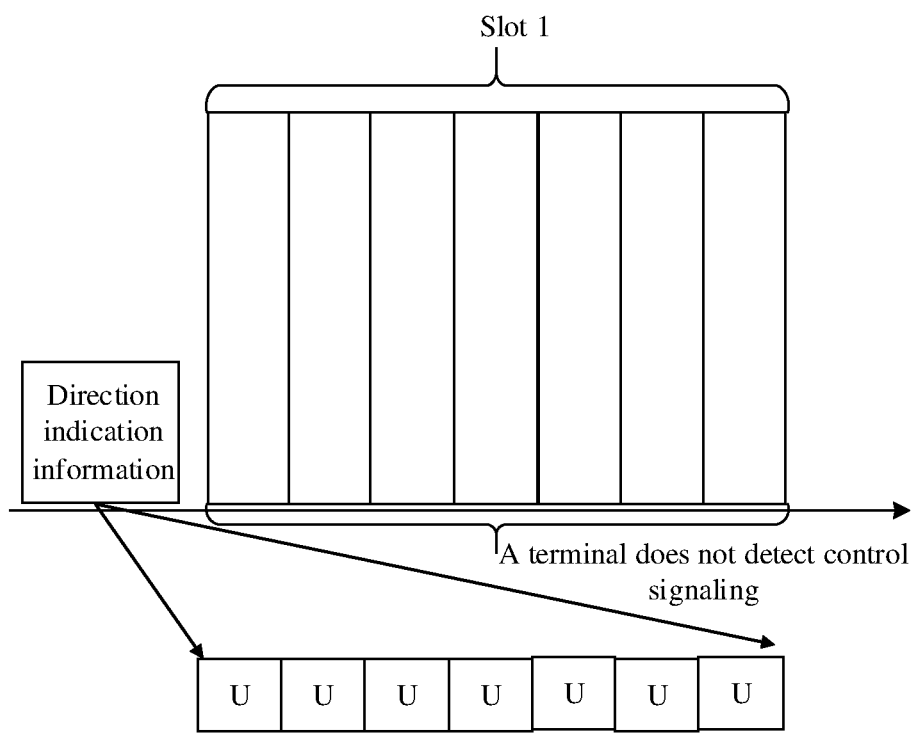
FIG. 3A is a schematic diagram of a slot, according to an exemplary embodiment.
Figure 3B:
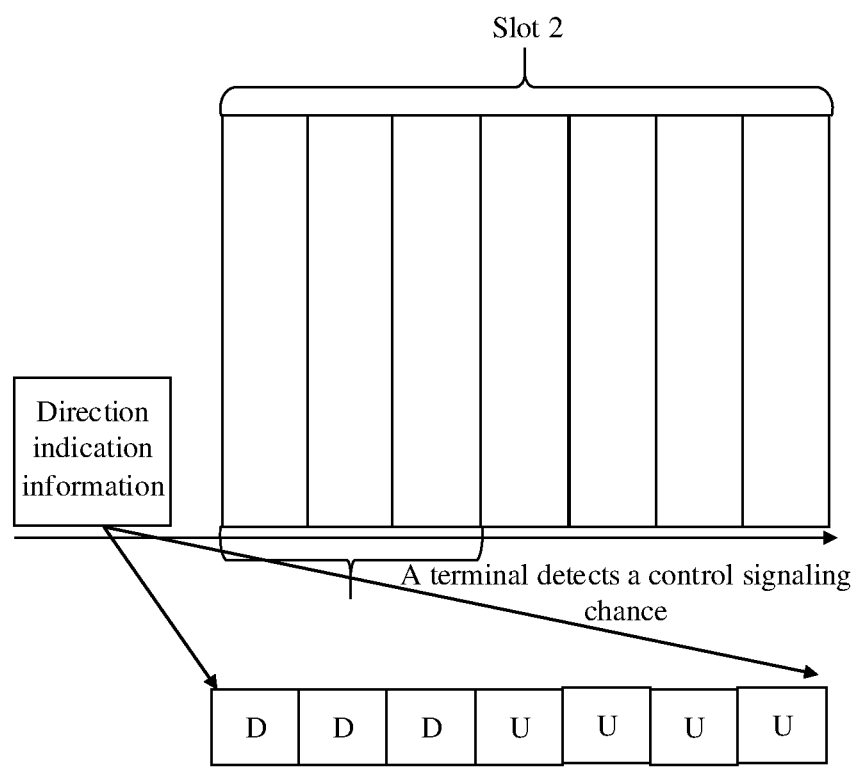
FIG. 3B is a schematic diagram of a slot, according to an exemplary embodiment.

FIG. 3A and FIG. 3B illustrate the transmission unit involved in step 201 and step 202 as well as the transmission direction of the transmission unit. FIG. 3A is a schematic diagram of Slot 1, according to an exemplary embodiment. As shown in FIG. 3A, the direction indication information in the awakening control signaling sent by the base station to the terminal indicates that each symbol among seven symbols in Slot 1 is an uplink transmission symbol. If the terminal is pre-configured by the base station to perform detection of the downlink control signaling on Slot 1, it can be determined that the terminal does not need to conduct downlink control signaling detection on Slot 1, namely the number of target transmission units is 0 at present. FIG. 3B is a schematic diagram of Slot 2, according to an exemplary embodiment. As shown in FIG. 3B, the direction indication information in the awakening control signaling sent by the base station to the terminal indicates that first three symbols on Slot 2 are symbols which can be configured for downlink transmission. If the terminal is pre-configured by the base station to perform detection of the downlink control signaling on first three symbols on Slot 2, the terminal needs to conduct downlink control signaling detections on first three symbols on Slot 2, namely the first symbols on Slot 2 are target transmission units.

Figure 4A:
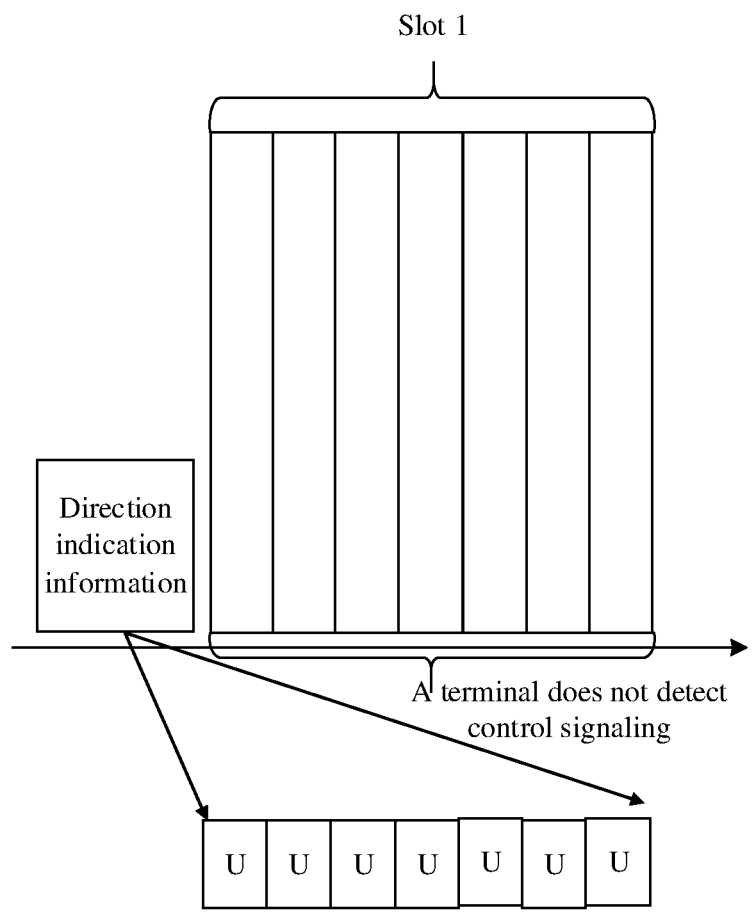
FIG. 4A is a schematic diagram of transmission units indicated in direction indication information, according to an exemplary embodiment.
Figure 4B:
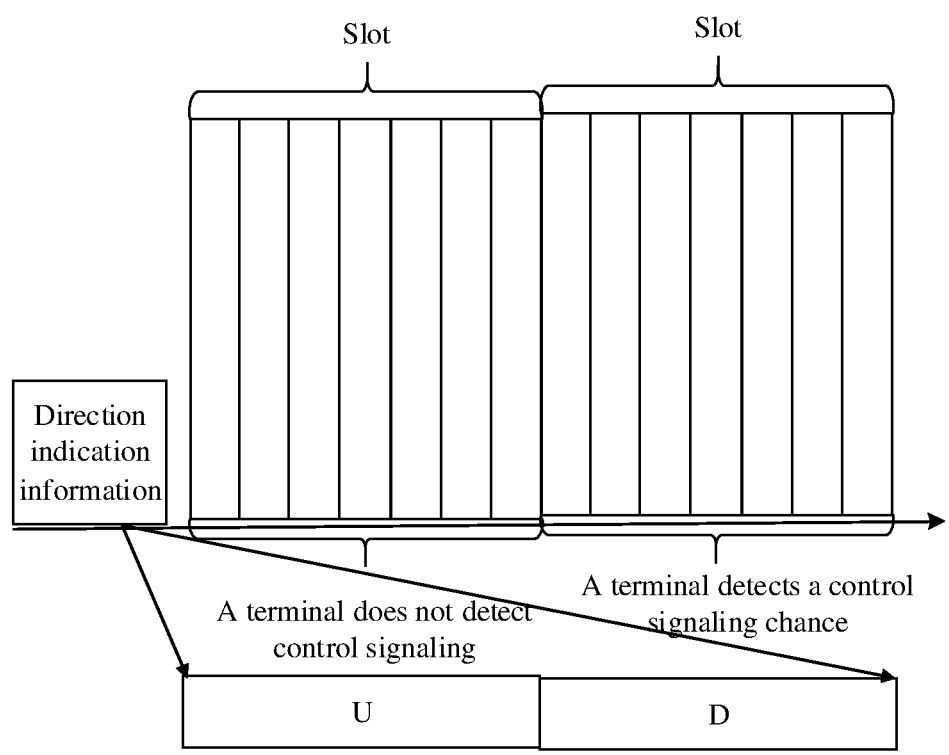
FIG. 4B is a schematic diagram of transmission units indicated in direction indication information, according to an exemplary embodiment.

FIG. 4A is a schematic diagram of transmission units indicated in direction indication information, according to an exemplary embodiment. FIG. 4B is a schematic diagram of transmission units indicated in direction indication information, according to an exemplary embodiment. As shown in FIG. 4A and FIG. 4B, a number of transmission units indicated in each piece of direction indication information can be equal or different. As shown in FIG. 4A, the number of symbols indicated in the direction indication information is seven, and the transmission directions for the seven symbols are uplink transmission direction, so that the terminal does not conduct downlink control signaling detection on the seven symbols. As shown in FIG. 4B, the number of symbols indicated in the direction indication information is fourteen, the transmission directions for the first seven symbols among the fourteen symbols are the uplink transmission direction, and the transmission directions for the last seven symbols are the downlink transmission direction, so that the terminal does not conduct downlink control signaling detection on the first seven symbols. If the terminal is pre-configured by the base station to detect the downlink control signaling on the last seven symbols, the terminal can conduct downlink control signaling detection on the last seven symbols.

Figure 5:
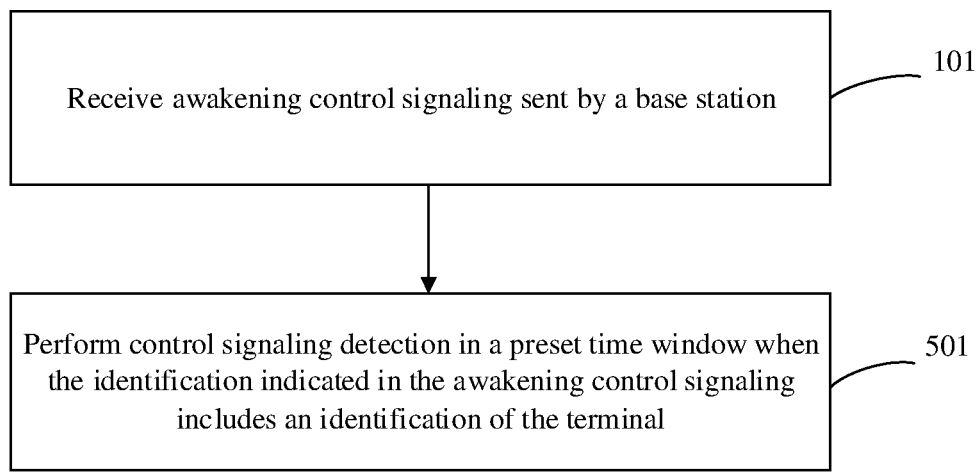
FIG. 5 is a flow chart of a method for downlink control signaling detection, according to an exemplary embodiment.
Figure 6:
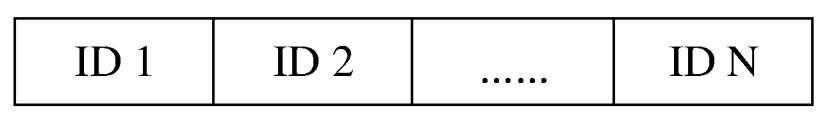

FIG. 5 is a flow chart of a method for downlink control signaling detection, according to an exemplary embodiment. In the embodiment, the awakening control signaling indicates an identification of a terminal for performing the control signaling detection in a preset time window. As shown in FIG. 5, step 102 of FIG. 1, i.e., performing the control signaling detection according to the awakening control signaling, may further include step 501. In step, the terminal performs the control signaling detection in the preset time window when, e.g., in response to that, an identification indicated in the awakening control signaling includes an identification of the terminal; and the terminal does not perform the control signaling detection when the identification indicated in the awakening control signaling does not include the identification of the terminal. For example, the awakening control signaling can be configured to indicate detection behaviors of a group of terminals. As shown in FIG. 6, the awakening control signaling includes identifications (IDs), namely ID1, ID2 . . . IDN, of the terminals which need to detect the downlink control signaling in a pre-defined time window. Hence, the terminals corresponding to these identifications need to detect the downlink control signaling in the pre-defined time window (an example of the above mentioned preset time window), and other terminals in the group do not need to detect the downlink control signaling.

Figure 7:
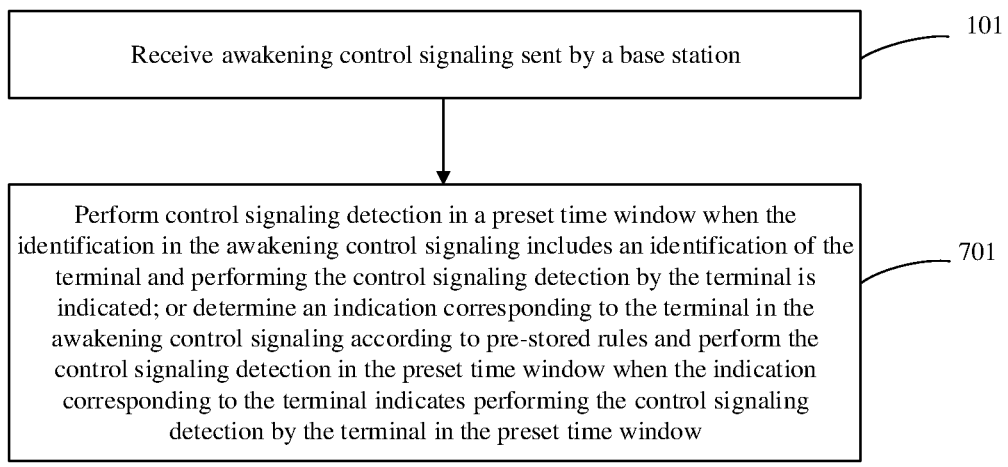
FIG. 7 is a flow chart of a method for downlink control signaling detection, according to an exemplary embodiment.

FIG. 7 is a flow chart of a method for downlink control signaling detection, according to an exemplary embodiment. In the embodiment, the awakening control signaling indicates an identification of a terminal which is used to perform control signaling detection and/or whether the terminal corresponding to the identification performs the downlink control signaling detection in the preset time window. As shown in FIG. 7, step 102 of FIG. 1, i.e., performing the control signaling detection according to the awakening control signaling may further include step 701. In step 701, the control signaling detection in the preset time window is performed when, e.g., in response to that, the identification in the awakening control signaling includes an identification of the terminal and performing the control signaling detection by the terminal is indicated; or the indication corresponding to the terminal in the awakening control signaling is determined according to pre-stored rules and when the indication corresponding to the terminal indicates performing the control signaling detection by the terminal in the preset time window, the control signaling detection in the preset time window is performed, wherein the rules pre-stored by the terminal may be rules defined in advance in a communication protocol and may also be rules informed to the terminal by the base station in advance.

The terminal may know the indication information corresponding to the terminal by calculating a position of the indication corresponding to the terminal in the awakening control signaling according to the rules. In the embodiment, the awakening control signaling may be downlink control signaling aiming at a group of terminals. The downlink control signaling can include an aggregation degree level and/or a candidate detection position which are pre-defined or configurable and is to be detected, wherein the aggregation degree level refers to a resource quantity occupied by downlink control signaling transmission; and the candidate detection position refers to a position of the to-be-detected downlink control signaling. Therefore, the downlink control signaling can display or implicitly indicate detection behaviors of a group of terminals.

Figure 8:
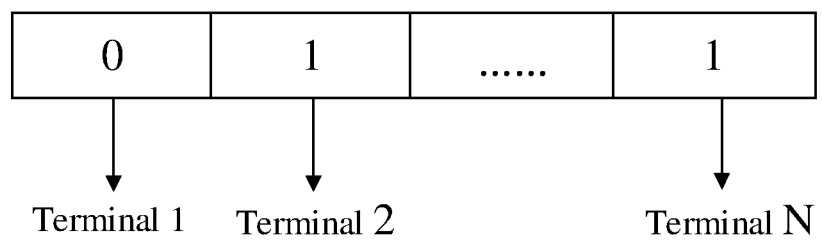
FIG. 8 is a schematic diagram of indication information in awakening control signaling, according to an exemplary embodiment.

For example, as shown in FIG. 8, the awakening control signaling may include detection indication information aiming at each terminal among a plurality of terminals (terminal 1, terminal 2 . . . terminal N as shown in FIG. 8). For example, the indication information having a value "0" indicates that the terminal does not need to conduct downlink control signaling detection in the pre-defined time window; and the indication information having a value "1" indicates that the terminal needs to conduct downlink control signaling detection in the pre-defined time window. The terminal can determine a position of indication information aiming at itself in the awakening control signaling based on a rule/information (such as identification information of the terminal) so as to acquire the indication information corresponding to the terminal. For example, as shown in FIG. 8, the terminal 1 determines that its indication information ranks the first place according to its own identification and then knows that the indication information of the first place is 0. This result indicates that the terminal 1 does not need to detect the downlink control signaling in the pre-defined time window. The indication information corresponding to the terminal 2 is "1", indicating that the terminal 2 needs to detect the downlink control signaling.

Figure 9:
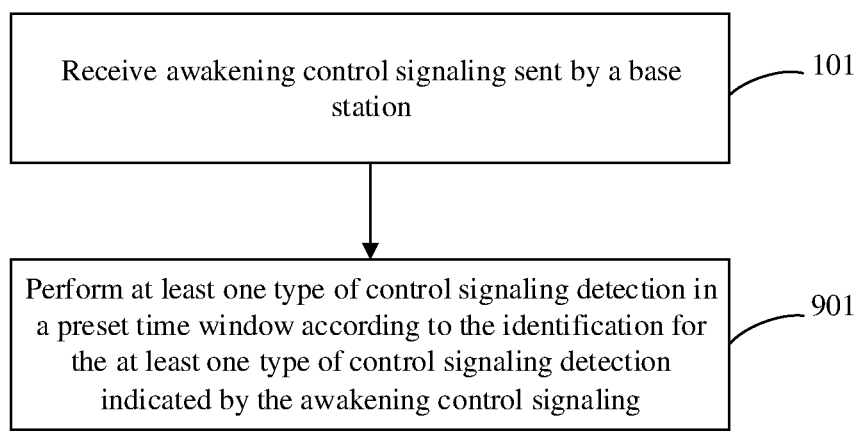
FIG. 9 is a flow chart of a method for downlink control signaling detection, according to an exemplary embodiment.

FIG. 9 is a flow chart of a method for downlink control signaling detection, according to an exemplary embodiment. In the embodiment, the awakening control signaling indicates an identification for at least one type of control signaling detection to be performed by the terminal in the preset time window. As shown in FIG. 9, step 102 of FIG. 1, i.e., performing the control signaling detection according to the awakening control signaling may further include step 901. In step 901, at least one type of control signaling detection is performed in the preset time window according to the identification for the at least one type of control signaling detection indicated by the awakening control signaling. For example, the indication includes, but is not limited to, at least one of: an identification of an aggregation degree level of the control signaling to be detected by the terminal, an identification of a length of signaling to be detected or an identification of a position of the downlink control signaling to be detected.

Figure 10:
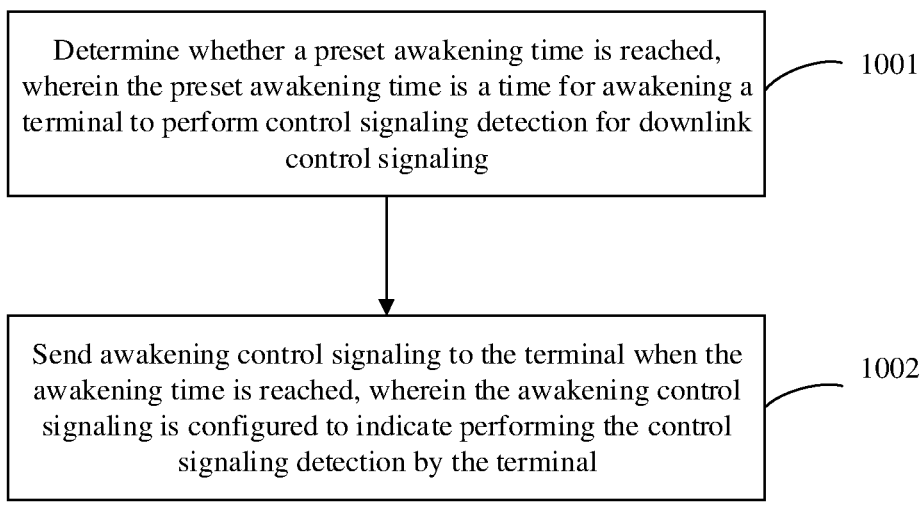
FIG. 10 is a flow chart of a method for downlink control signaling detection, according to an exemplary embodiment.

FIG. 10 is a flow chart of a method for downlink control signaling detection, according to an exemplary embodiment. As shown in FIG. 10, the method includes the following steps.

In step 1001, whether a preset awakening time is reached is determined, wherein the preset awakening time is a time for awakening a terminal to perform control signaling detection for downlink control signaling.

In step 1002, the awakening control signaling is sent to the terminal when the awakening time is reached, wherein the awakening control signaling includes indication information for the terminal to perform the control signaling detection.

In one implementation, one time or one group of times for a terminal to perform downlink control signaling detection can be pre-configured by the base station, e.g., the above awakening times, and awakening control signaling is sent to the terminal when each detection time is reached or during a period before arrival of each detection time.

In one implementation, the awakening control signaling may be downlink control signaling aiming at one or more terminals, wherein the signaling may include direction indication information, and the direction indication information may include a transmission direction of at least one transmission unit to be used by the terminal immediately. For example, seven symbols may be indicated as symbols configured for uplink transmission.

In one implementation, the awakening control signaling may be downlink control signaling aiming at a group of terminals, wherein the signaling may include identifications of terminals for performing the downlink control signaling detection in the preset time window, such as ID1, ID2 . . . IDN as shown in FIG. 6. Under this case, the base station can send the awakening control signaling to each terminal among the group of terminals. After each terminal receives the awakening control signaling, those terminals which find that the awakening control signaling includes their own identifications perform downlink control signaling detection, and those terminals which do not find existence of their own identifications in the awakening control signaling do not perform the downlink control signaling detection.

In one implementation, the awakening control signaling may be downlink control signaling aiming at a group of terminals. The downlink control signaling may include identifications of terminals and/or indications that the terminals corresponding to the identifications perform or do not perform the control signaling detection in a preset time window. In this case, the base station may send the awakening control signaling to each terminal among the group of terminals. After each terminal receives the awakening control signaling, when the terminal finds that the indication information corresponding to its own identification in the awakening control signaling indicates that the terminal needs to perform the downlink control signaling detection, the terminal performs the downlink control signaling detection; and when the terminal finds that the indication information corresponding to its own identification in the awakening control signaling indicates that the terminal does not need to perform the downlink control signaling detection, the terminal does not perform the downlink control signaling detection. For example, as shown in FIG. 8, indication information corresponding to the terminal 1 is "0", indicating that the terminal 1 does not need to detect the downlink control signaling in the pre-defined time window; and the indication information corresponding to the terminal 2 is "1", indicating that the terminal 2 needs to detect the downlink control signaling.

In one implementation, the awakening control signaling may be downlink control signaling aiming at a terminal, wherein the control signaling may indicate an identification for at least one type of control signaling detection to be detected by the terminal in the preset time window. For example, the identification includes but is not limited to, at least one of: an identification of an aggregation degree level of the downlink control signaling to be detected by the terminal, an identification of a length of the downlink control signaling to be detected or an identification of a position of the downlink control signaling to be detected.

Figure 11:
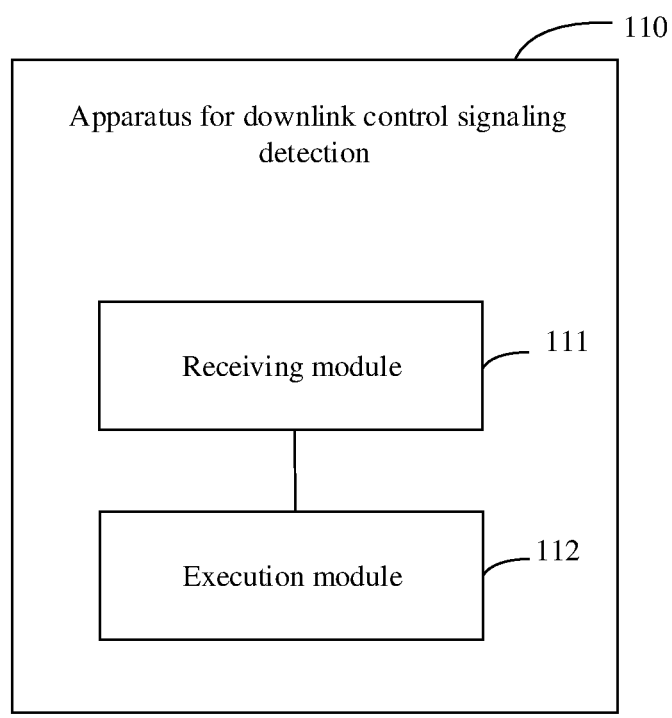
FIG. 11 is a block diagram of an apparatus for downlink control signaling detection, according to an exemplary embodiment.

FIG. 11 is a block diagram of an apparatus 110 for downlink control signaling detection, according to an exemplary embodiment. The apparatus 110 may be applied to a terminal. As shown in FIG. 11, the apparatus 110 includes a receiving module 111 and an execution module 112.

The receiving module 111 is configured to receive awakening control signaling sent by a base station, wherein the awakening control signaling includes indication information for a terminal to perform control signaling detection.

The execution module 112 is configured to perform the control signaling detection according to the awakening control signaling.

Figure 12:
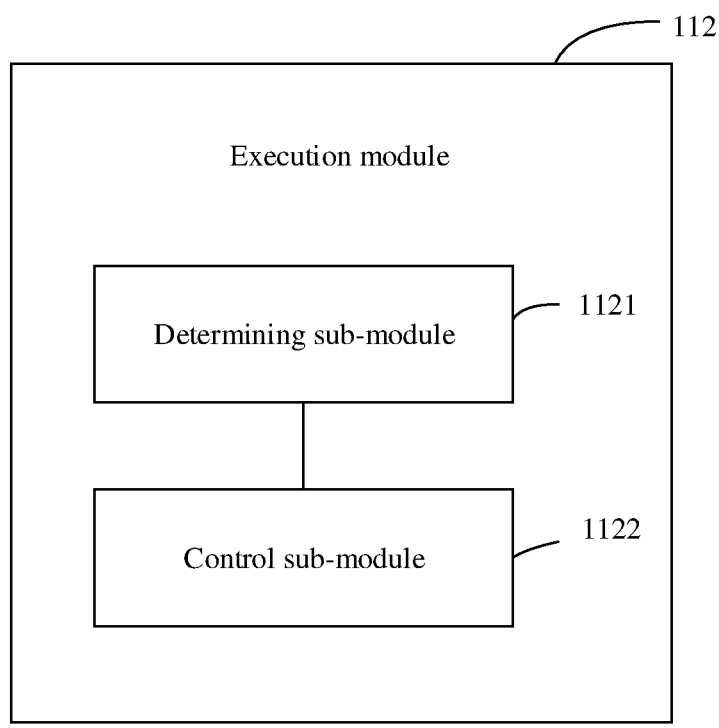
FIG. 12 is a block diagram of an apparatus for downlink control signaling detection, according to an exemplary embodiment.

FIG. 12 is a block diagram of an apparatus for downlink control signaling detection, according to an exemplary embodiment. In the embodiment, the awakening control signaling indicates a transmission direction of at least one transmission unit for the terminal. As shown in FIG. 12, the execution module 112 (FIG. 11) may include a determining sub-module 1121 and a control sub-module 1122.

The determining sub-module 1121 is configured to determine a target transmission unit for performing the control signaling detection according to transmission directions of transmission units and transmission units for the control signaling detection pre-configured by the base station. The control sub-module 1122 is configured to control the terminal to perform the control signaling detection on the target transmission unit.

In one implementation, the awakening control signaling indicates an identification of a terminal for performing the control signaling detection in a preset time window. The execution module 112 may be configured to: perform the control signaling detection in the preset time window when identification indicated in the awakening control signaling includes an identification of the terminal.

In one implementation, the awakening control signaling includes an identification of a terminal which is used to perform control signaling detection, and/or an indication that the terminal corresponding to the identification performs or does not perform the control signaling detection in a preset time window. The execution module 112 may be configured to: perform the control signaling detection in the preset time window when the identification in the awakening control signaling includes an identification of the terminal and performing the control signaling detection by the terminal is indicated; or determine the indication corresponding to the terminal in the awakening control signaling according to pre-stored rules and perform the control signaling detection in the preset time window when the indication corresponding to the terminal indicates performing the control signaling detection by the terminal in the preset time window.

In one implementation, the awakening control signaling indicates an identification for at least one type of control signaling detection to be performed by the terminal in the preset time window, and the execution module 112 may be configured to: perform the at least one type of control signaling detection in the preset time window according to the identification for the at least one type of control signaling detection indicated by the awakening control signaling.

Figure 13:
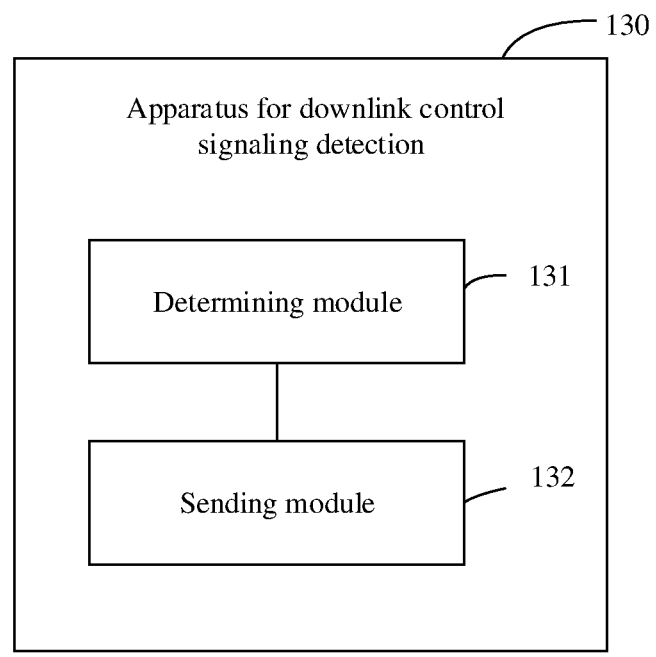
FIG. 13 is a block diagram of an apparatus for downlink control signaling detection, according to an exemplary embodiment.

FIG. 13 is a block diagram of an apparatus 130 for downlink control signaling detection, according to an exemplary embodiment. The apparatus 130 may be applied to a base station. As shown in FIG. 13, the apparatus 130 includes a determining module 131 and a sending module 132.

The determining module 131 is configured to determine whether a preset awakening time is reached, wherein the preset awakening time is a time for awakening a terminal to perform control signaling detection for downlink control signaling. The sending module 132 is configured to send the awakening control signaling to the terminal when the awakening time is reached, wherein the awakening control signaling includes indication information for the terminal to perform the control signaling detection.

In one implementation, the awakening control signaling may indicate a transmission direction of at least one transmission unit for the terminal.

In one implementation, the sending module 132 may be configured to: send the awakening control signaling to a terminal, wherein the awakening control signaling includes an identification of the terminal for performing the control signaling detection in a preset time window.

In another implementation, the sending module 132 may be configured to: send the awakening control signaling to a terminal, wherein the awakening control signaling includes an identification of the terminal which is used to perform control signaling detection, and/or an indication that the terminal corresponding to the identification performs or does not perform the control signaling detection in a preset time window.

In one implementation, the awakening control signaling indicates an identification for at least one type of control signaling detection to be performed by the terminal in the preset time window.

Figure 14:
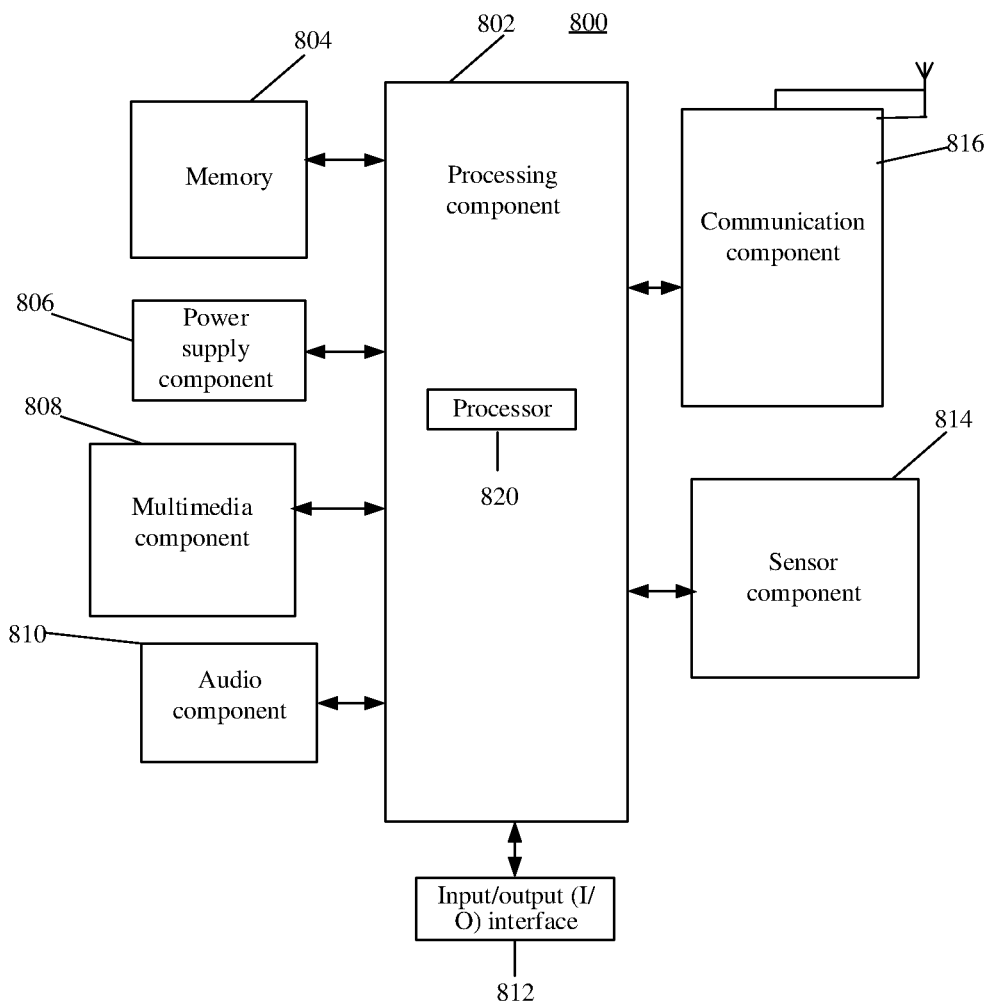
FIG. 14 is a block diagram of an apparatus for downlink control signaling detection, according to an exemplary embodiment.

FIG. 14 is a block diagram of an apparatus 800 for downlink control signaling detection. For example, the apparatus 800 may be a mobile phone, a computer, a digital broadcast terminal, a messaging apparatus, a gaming console, a tablet, medical equipment, exercise equipment, a personal digital assistant, and the like.

Referring to FIG. 14, the apparatus 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls the overall operation of the apparatus 800, such as operations associated with display, telephone call, data communication, camera operation and recording operation. The processing component 802 may include one or a plurality of processors 820 to execute instructions to complete all or part of the steps of the method described above. In addition, the processing component 802 may include one or a plurality of modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory apparatuses, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 806 supplies power to various components of the apparatus 800. The power supply component 806 may include a power management system, one or a plurality of power supplies, and other components associated with generating, managing, and distributing power for the apparatus 800.

The multimedia component 808 includes a screen providing an output interface between the apparatus 800 and a user. In some embodiments, the screen may include a Liquid Crystal Display (LCD) and a Touch Panel (TP). If it includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 808 includes a front camera and/or a rear camera. When the apparatus 800 is in an operation mode, such as shooting mode or video mode, the front camera and/or the rear camera can receive external multimedia data. Each front camera and each rear camera may be fixed optical lens systems or may have focal lengths and optical zoom capabilities.

The audio component 810 is configured to output and/or input audio signals. For example, the audio component 810 includes a microphone (MIC) configured to receive external audio signals when the apparatus 800 is in an operation mode, such as a call mode, a recording mode and a voice recognition mode. The received audio signals may be further stored in the memory 804 or sent via the communication component 816. In some embodiments, the audio component 810 further includes a speaker configured to output audio signals.

The I/O interface 812 provides an interface between the processing component 802 and a peripheral interface module. The peripheral interface module may be a keyboard, a click wheel, buttons, etc. These buttons may include, but not limited to: a home button, a volume button, a start button, and a lock button.

The sensor component 814 includes one or a plurality of sensors configured to provide various aspects of state evaluation for the apparatus 800. For example, the sensor component 814 can detect the on/off state of the apparatus 800, and the relative positioning of the components, such as the display and keypad of the apparatus 800. The sensor component 814 can also detect the position change of the apparatus 800 or one component of the apparatus 800, the existence or nonexistence of the user's contact with the apparatus 800, the orientation or acceleration/deceleration of the apparatus 800, and the temperature change of the apparatus 800. The sensor component 814 may include a proximity sensor configured to detect the existence of nearby objects under the situation of no physical contact. The sensor component 814 may also include an optical sensor, such as a CMOS or CCD image sensor, for use in imaging application. In some embodiments, the sensor component 814 may further include at least one of: an accelerometer sensor, a gyroscope sensor, a magnetic sensor, a pressure sensor, or a temperature sensor.

The communication component 816 is configured to facilitate communication, wired or wirelessly, between the apparatus 800 and other apparatuses. The apparatus 800 may access a wireless network based on a communication standard, such as WiFi, 4G or 5G, or a combination thereof. In one exemplary embodiment, the communication component 816 receives broadcast signals or broadcast related information from an external broadcast management system via a broadcast channel. In one exemplary embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the apparatus 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In one exemplary embodiment, there is provided a non-transitory computer-readable storage medium including instructions, such as the memory 804 including instructions, which may be executed by the processor 820 of the apparatus 800 to perform the above described methods. For example, the non-transitory computer-readable storage medium may be an ROM, an RAM, a CD-ROM, a magnetic tape, a floppy disk, an optical data storage apparatus, and the like.

Figure 15:
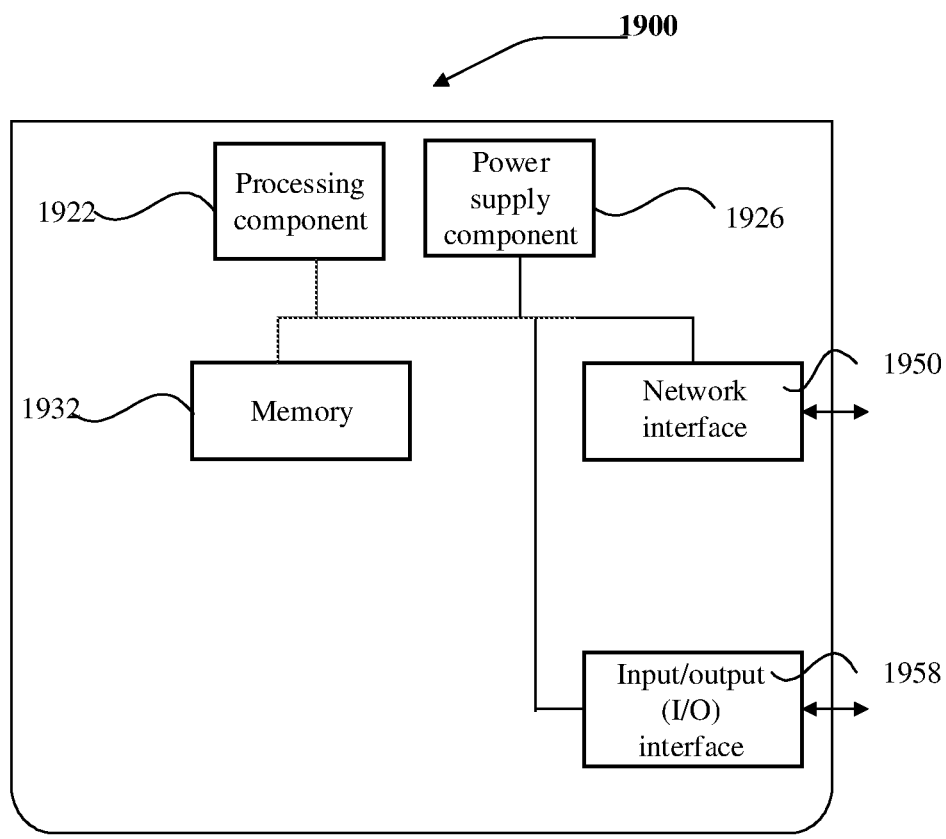
FIG. 15 is a block diagram of an apparatus for downlink control signaling detection, according to an exemplary embodiment.

FIG. 15 is a block diagram of an apparatus 1900 for downlink control signaling detection, according to an exemplary embodiment. For example, the apparatus 1900 can be provided as a base station. Referring to FIG. 15, the apparatus 1900 includes a processing component 1922, which further includes one or more processors, and memory resources represented by a memory 1932 for storing instructions capable of being executed by the processing component 1922, such as application programs. The application programs stored in the memory 1932 may include one or more modules each of which corresponds to a set of instructions. Furthermore, the processing component 1922 is configured to execute instructions to perform the above described methods.

The apparatus 1900 may also include a power supply component 1926 configured to perform power management of the apparatus 1900, a wired or wireless network interface 1950 configured to connect the apparatus 1900 to the network, and an input/output (I/O) interface 1958. The apparatus 1900 may operate an operating system stored in the memory 1932, such as Windows Server™, Mac OS X™, Unix™, Linux™, FreeBSD™ or the like.

In an exemplary embodiment, a non-transitory computer-readable storage medium including instructions, such as the memory 1932 including instructions, is further provided. The instructions may be executed by a processor in the processing component 1922 of the apparatus 1900 to perform the above described methods. For example, the non-transitory computer-readable storage medium may be an ROM, an RAM, a CD-ROM, a magnetic tape, a floppy disk, an optical data storage apparatus, and the like.

Other embodiments of the disclosure will be apparent to those skilled in the art from consideration of the specification and practice of the disclosure. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for downlink control signaling detection, wherein the method is applied to a terminal and comprises:
   receiving awakening control signaling sent by a base station, the awakening control signaling comprising indication information for the terminal to perform control signaling detection for downlink control signaling; and
   performing the control signaling detection according to the awakening control signaling, wherein the awakening control signaling indicates a transmission direction of at least one transmission unit for the terminal, and performing the control signaling detection according to the awakening control signaling comprises:
determining, according to the transmission direction of the at least one transmission unit and at least one transmission unit for the control signaling detection pre-configured by the base station, a target transmission unit for performing the control signaling detection, wherein if among a plurality of symbols indicated in the awakening control signaling, a transmission direction for a first part of the plurality of symbols is an uplink transmission direction, and a transmission direction for a second part of the plurality of symbols is a downlink transmission direction, the terminal does not perform downlink control signaling detection on the first part of the plurality of symbols, and the terminal performs the downlink control signaling detection on the second part of the plurality of symbols in a case that the terminal is pre-configured by the base station to detect the downlink control signaling on the second part of the plurality of symbols; and
controlling the terminal to perform the control signaling detection on the target transmission unit,
wherein the awakening control signaling indicates an identification for at least one type of control signaling detection to be performed by the terminal in a preset time window, and performing the control signaling detection according to the awakening control signaling comprises:
performing the at least one type of control signaling detection in the preset time window according to the identification for the at least one type of control signaling detection indicated by the awakening control signaling, wherein the identification comprises an identification of an aggregation degree level of a control signaling to be detected by the terminal, an identification of a length of a signaling to be detected, and an identification of a position of the downlink control signaling to be detected.

2. The method of claim 1, wherein the awakening control signaling indicates an identification of the terminal to perform the control signaling detection in a preset time window, and performing the control signaling detection according to the awakening control signaling comprises:
performing, by the terminal, the control signaling detection in the preset time window in response to the awakening control signaling indicating the identification of the terminal.

3. The method of claim 1, wherein the awakening control signaling comprises an identification of the terminal to perform control signaling detection, and an indication that the terminal corresponding to the identification performs or does not perform the control signaling detection in a preset time window, and performing the control signaling detection according to the awakening control signaling comprises:
performing, by the terminal, the control signaling detection in the preset time window in response to the awakening control signaling comprising the identification of the terminal and indicating performing the control signaling detection by the terminal.

4. The method of claim 1, wherein the awakening control signaling comprises an identification of the terminal to perform control signaling detection, and performing the control signaling detection according to the awakening control signaling comprises:

determining an indication corresponding to the terminal in the awakening control signaling according to pre-stored rules and, when the indication corresponding to the terminal indicates performing the control signaling detection by the terminal in a preset time window, performing, by the terminal, the control signaling detection in the preset time window.

5. A terminal, comprising:
a processor; and
a memory configured to store instructions executable by the processor;
wherein the processor is configured to:
receive awakening control signaling sent by a base station, wherein the awakening control signaling comprises indication information for the terminal to perform control signaling detection for downlink control signaling; and
perform the control signaling detection according to the awakening control signaling,
wherein the awakening control signaling indicates a transmission direction of at least one transmission unit for the terminal, and in performing the control signaling detection according to the awakening control signaling, the processor is further configured to:
determine, according to the transmission direction of the at least one transmission unit and at least one transmission unit for the control signaling detection pre-configured by the base station, a target transmission unit for performing the control signaling detection, wherein if among a plurality of symbols indicated in the awakening control signaling, a transmission direction for a first part of the plurality of symbols is an uplink transmission direction, and a transmission direction for a second part of the plurality of symbols is a downlink transmission direction, the terminal does not perform downlink control signaling detection on the first part of the plurality of symbols, and the terminal performs the downlink control signaling detection on the second part of the plurality of symbols in a case that the terminal is pre-configured by the base station to detect the downlink control signaling on the second part of the plurality of symbols; and
control the terminal to perform the control signaling detection on the target transmission unit,
wherein the awakening control signaling indicates an identification for at least one type of control signaling detection to be performed by the terminal in a preset time window, and the processor is further configured to:
perform the at least one type of control signaling detection in the preset time window according to the identification for the at least one type of control signaling detection indicated by the awakening control signaling, wherein the identification comprises an identification of an aggregation degree level of a control signaling to be detected by the terminal, an identification of a length of a signaling to be detected, and an identification of a position of the downlink control signaling to be detected.

6. The terminal of claim 5, wherein the awakening control signaling indicates an identification of the terminal to perform the control signaling detection in a preset time window, and the processor is further configured to:
perform the control signaling detection in the preset time window in response to the awakening control signaling indicating the identification of the terminal.

7. The terminal of claim 5, wherein the awakening control signaling comprises an identification of the terminal to perform the control signaling detection, and an indication that the terminal corresponding to the identification performs or does not perform the control signaling detection in a preset time window, and the processor is further configured to:
    perform the control signaling detection in the preset time window in response to the awakening control signaling comprising the identification of the terminal and indicating performing the control signaling detection by the terminal.

8. The terminal of claim 5, wherein the awakening control signaling comprises an identification of the terminal to perform control signaling detection, and the processor is further configured to:
    determine an indication corresponding to the terminal in the awakening control signaling according to pre-stored rules and, when the indication corresponding to the terminal indicates performing the control signaling detection by the terminal in a preset time window, perform the control signaling detection in the preset time window.

\* \* \* \* \*